United States Patent [19]

Jurisson et al.

[11] 4,286,286
[45] Aug. 25, 1981

[54] PHOTO CONTROLLED STEREOSCOPIC TELEVISION SYSTEM

[75] Inventors: Jaan Jurisson, Anoka County; Aida S. Khalafalla, Hennepin County, both of Minn.

[73] Assignee: Honeywell Inc., Minneapolis, Minn.

[21] Appl. No.: 35,173

[22] Filed: May 2, 1979

[51] Int. Cl.³ .............................................. H04N 9/54
[52] U.S. Cl. ..................................................... 358/92
[58] Field of Search ............................ 358/88, 91, 92; 350/132; 352/62, 63

[56] References Cited

U.S. PATENT DOCUMENTS

| | | | |
|---|---|---|---|
| 2,516,718 | 7/1950 | Oriol | 352/63 |
| 3,621,127 | 4/1971 | Hope | 358/92 |
| 3,737,567 | 6/1973 | Kratomi | 358/92 |
| 3,903,358 | 9/1975 | Roese | 358/92 |
| 4,021,846 | 5/1977 | Roese | 358/92 |
| 4,145,713 | 3/1979 | White | 358/92 |
| 4,153,334 | 5/1979 | Kato et al. | 350/132 |

FOREIGN PATENT DOCUMENTS

| | | | |
|---|---|---|---|
| 2399173 | 3/1979 | France | 358/92 |
| 602035 | 5/1948 | United Kingdom | 352/62 |

OTHER PUBLICATIONS

Soltoff-Television Applications of PLZT Ceramics-Internat. Broadcast Engineer, vol. 7, #137–138, pp. 18–21, Jun.–Jul. 1976.

Primary Examiner—Joseph A. Orsino, Jr.
Attorney, Agent, or Firm—Charles G. Mersereau

[57] ABSTRACT

A three-dimension or stereo television viewing system is disclosed which multiplexes alternate left-right image presentations from two television cameras which are separated horizontally and aimed so that their optical axes intersect. One field of the standard interlace frame is selected from the left-hand camera and multiplexed but the alternate field from the right-hand camera with the multiplexed video frame being displayed on the standard television monitor. An electrically controlled viewer is provided for each user which employs electro-optic shutter lenses which are caused to switched in synchronisims with the alternating television fields. Direct connection between the viewers and the rest of the system is eliminated by the provision of a photoemitting and photodetection system in which coded pulses from the photoemitters are utilized by the photo detectors to operate the lenses of the stereo viewers in synchronism with the TV fields. Provision is made for the condition when no photo signal is received such that the lenses are in the open or transparent state.

4 Claims, 8 Drawing Figures

PHOTO CONTROLLED STEREOSCOPIC TELEVISION SYSTEM

BACKGROUND OF THE INVENTION

1. Field of the Invention

The invention pertains generally to the field of stereoscopic television and, more particularly to a stereoscopic television viewing system in which alternate left and right images are presented to the corresponding left and right eyes of a viewing person in a synchronous using manner optical signals.

2. Description of the Prior Art

While the field of stereoscopic television is a relatively new branch of the electro-optical arts, many schemes and systems have been devised in order that the viewer may be presented with what he conceives to be a three-dimensional or stereo television image. These various systems are characterized by several methods of image separation and recombination including electro-mechanical shutter devices and devices having electro-optic shutters which are directly connected by wire to the remainder of this stereoscopic television system.

One such device is illustrated and described in a patent to Roese U.S. Pat. No. 3,903,358, issued Sept. 2, 1975, which illustrates and describes a stereoscopic television system which employs a single camera and a beam splitting system to present alternate left and right image inputs to a television monitor. A stereoscopic viewing system is used which includes glasses having left and right PLZT electro-optic light valve lenses the opening and closing of which is controlled in synchronization with the left and right image presentation by the monitor. The left and right presentation of images is made using the interlace pattern of the two scanning fields of the standard TV frame. While this system has proved to be highly successful, the necessity for directly connecting the stereo viewer glasses with the viewer distribution circuit greatly encumbers the activity of the viewing person and also makes it quite difficult for a plurality of viewers to simultaneously view this same stereoscopic television presentation as additional sets of connecting wires must be provided.

Another synchronized stereoscopic television system is illustrated and described in a patent to Hope U.S. Pat. No. 3,621,127 issued Nov. 16, 1971. That system utilizes a high frequency carrier transmitter and receiving system to transmit and receive timed signals which are then utilized to operate a shuttering spectacle such that the left and right eye elements are opened and closed alternately in response to the high frequency signals. While this system eliminates the necessity of direct connection between the spectacles and the control and synchronizing system of the stereoscopic television viewing system there may be unwanted interference from or with other high frequency signals. In addition, the system is nondirectional so that the spectacles operate whether or not the wearer's attention is directed toward the screen.

SUMMARY OF THE INVENTION

According to the present invention, the problems associated with prior art viewers in stereo television systems has been eliminated by the provision of a special coded light emitting and directional receiving system which is utilized to operate the left and right lenses of individual portable viewing stations or stereo viewer spectacles such that many persons can view the same presentation without any direct connection thereto nor any need for transmission or reception of high frequency carrier signals. The directional receiving system allows both lenses to be open or transparent when the wearer's attention is away from the screen.

The system includes two standard television cameras which are separated horizontally and are aimed so that their optical axes intersect so that they present identical fields of view from slightly different viewing angles. The sweep circuits of the cameras are synchronized together such that one field of the standard interlaced television frame is selected from the left-hand camera and multiplexed with the alternate field from the right-hand camera with the multiplexed video frame displayed on a standard TV monitor. A photoemitter associated with the monitor emits coded light pulses associated with each field of each interlaced frame. A photodetector is provided on the stereo viewers such that when a viewing person is looking at a monitor the coded signal is received by a photodetector and utilized to operate an electronic switching means associated with opening and closing the left and right lenses of the stereo viewer in synchronization with the fields presented by the monitor. Unlike other systems, when the observer turns his head away from the television screen, no radiation from the light emitting means is received by the photodetection means and the switching means control causes both lenses to be the open or transparent state thereby permitting unrestricted viewing of the activities about the television monitor without the need of removing the viewers.

BRIEF DESCRIPTION OF THE DRAWINGS

In the drawings wherein like numerals are used to designate like parts throughout the same.

DESCRIPTION OF THE PREFERRED EMBODIMENT

Human beings (and most animals) are able to perceive depth (3-D or stereo) because their sight depends on a pair of eyes which are separated horizontally and hence each eye sees a slightly different view of any object in the field of vision. The brain, in resolving the discrepancies between the images seen by each eye, interprets the discrepancies as differences in depth. This phenomenon is known as binocular vision.

Binocular vision is probably due to a combination of physiological and psychological characteristics. It is known that some of the optic nerves from each eye are cross-mapped into the brain area for the other eye.

Apparently some sort of spatial correlation process takes place in these cross-mapped areas as the brain appears to use the angular separation cues to develop a single "fused" image. If the angular cues are large, motor responses are triggered to change the focus and convergence of the eye in order to superimpose "major features" of the individual images. If the angular separation of the images is small, less than about one degree, the brain is able to fuse the individual images into a single stereo image without the necessity for refocusing or changing the convergence of the eyes. Furthermore, it is not necessary to present images to both eyes simultaneously for stereo images to be perceived. It appears that depth perception is possible if the individual images for the two eyes are separated in time by as much as 1/10 second.

All broadcast television and most closed circuit television in both the United States and Europe are characterized by horizontal line scanning from left to right, vertical scanning from top to bottom which occurs at a lower rate than the horizontal scanning, and a 2-to-1 interlace of line scans.

The nominal scanning rates for U.S. television are 15750 horizontal scans per second and 60 vertical scans per second. Therefore, during each vertical scan, which requires 1/60 second, 262.5 horizontal scans occur, and during two vertical scans (1/30 second) 525 horizontal scans are completed. The time required for one vertical scan is defined as a field and the time required for two vertical scans is called a frame.

The phasing of the horizontal and vertical scans is such that in one field (1/60 second interval in U.S. standards) the first horizontal scan occurs beginning at the upper left-hand corner of the scene. Because a non-integral number of scans (262.5) occurs in one field, the last scan of the field one ends in the middle of the scene. At the end of the last scan of field one vertical flyback occurs and field two begins its horizontal traces at the top center and the last scan ends at the lower right of the screen. Following the vertical retrace of field two, the next horizontal trace occurs at the upper left-hand corner so that the paths of field one are retraced. The horizontal traces of the two fields are interlaced and this phenomenon is known as 2-to-1 interlace.

Field one is generated over a period of 1/60 second and is followed by field two during the next 1/60 second. Thus, two fields or one frame are required to generate all of the visual information displayed on the TV screen and a frame is generated each 1/30 second.

These times are sufficiently short so that the brain perceives the TV picture as if all parts were shown simultaneously. In addition, if one eye is allowed to perceive only one of the two fields and the other eye only the alternate field, the brain tends to interpret this presentation as if all parts were viewed simultaneously.

Figure 1:
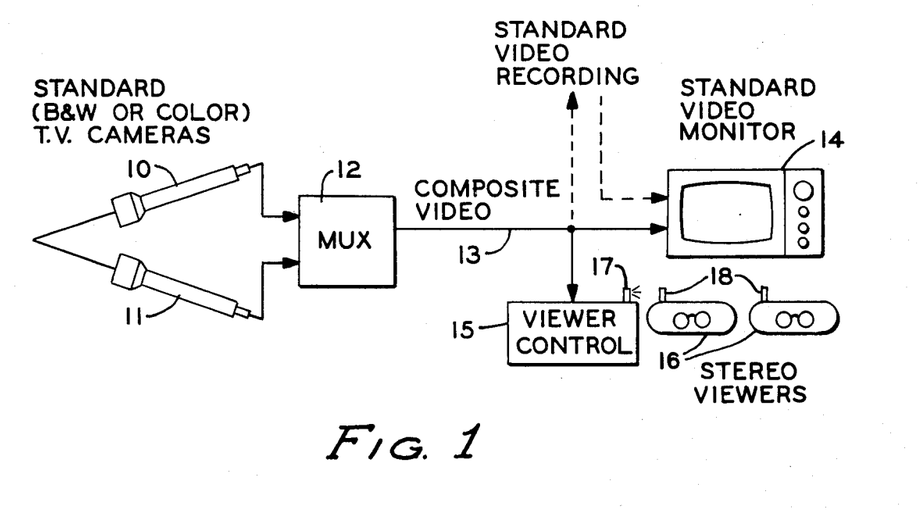
FIG. 1 is a diagram of the stereo television system of the invention.

One possible embodiment of the stereo television system of the present invention is shown in block form in FIG. 1. The properties of human binocular vision and of interlaced standard TV are combined using two standard television cameras, 10 and 11, which may be either black and white or color. The cameras are situated such that they register identical fields of view and are synchronized together. The cameras are mounted in substantially the same horizontal plane with a spacing between them and are oriented so that their optical axes intersect. Consequently, each camera views the scene from a slightly different angle in the manner of a pair of eyes.

A multiplexing unit (MUX) 12 selects one field from the left-hand camera 11 and the alternate field from the right hand camera 10 and combines them into a composite video signal. This composite video signal contains synchronizing pulses (described below) and the bandwidth of each field is identical to that of the originating cameras. Consequently, the multiplexed composite video signal may be transmitted by cable as at 13 or by R.F. channel suitable for standard television, and may be displayed on any standard monitor as at 14 or recorded on standard video recording equipment not shown. Because the cameras view the scene from slightly different angles, all objects in the scene, when viewed by the naked eye, will appear to have double images except for the line-of-sight crossover point. One image is produced by the left hand camera during one field scan, while the second image will be produced by the right-hand camera during the alternate field scan.

A viewer control 15, discussed in greater detail below, extracts synchronizing signals from the composite video and controls electronic shutters (FIG. 7) in the stereo viewers 16 by means of an optical emitter 17 and receiver 18. The electronic shutters are switched so that the left shutter is open only when the left camera field is being received, and the right shutter is on only during the alternate field being received from the right camera. Consequently when the user looks at the monitor 14, the left eye sees only the left camera picture and the right eye sees only the right camera picture. The binocular vision characteristics of the eyes and brain cause the user to perceive the 3-D view, essentially as if his eyes were at the camera locations. Since the shutter action takes place immediately in front of the user's eyes, his position with respect to the monitor is not restricted. A 3-D image will be perceived at any angle where the screen is visible, and at any orientation of the user's head provided that the signals from 17 can be received at 18.

Figure 2:
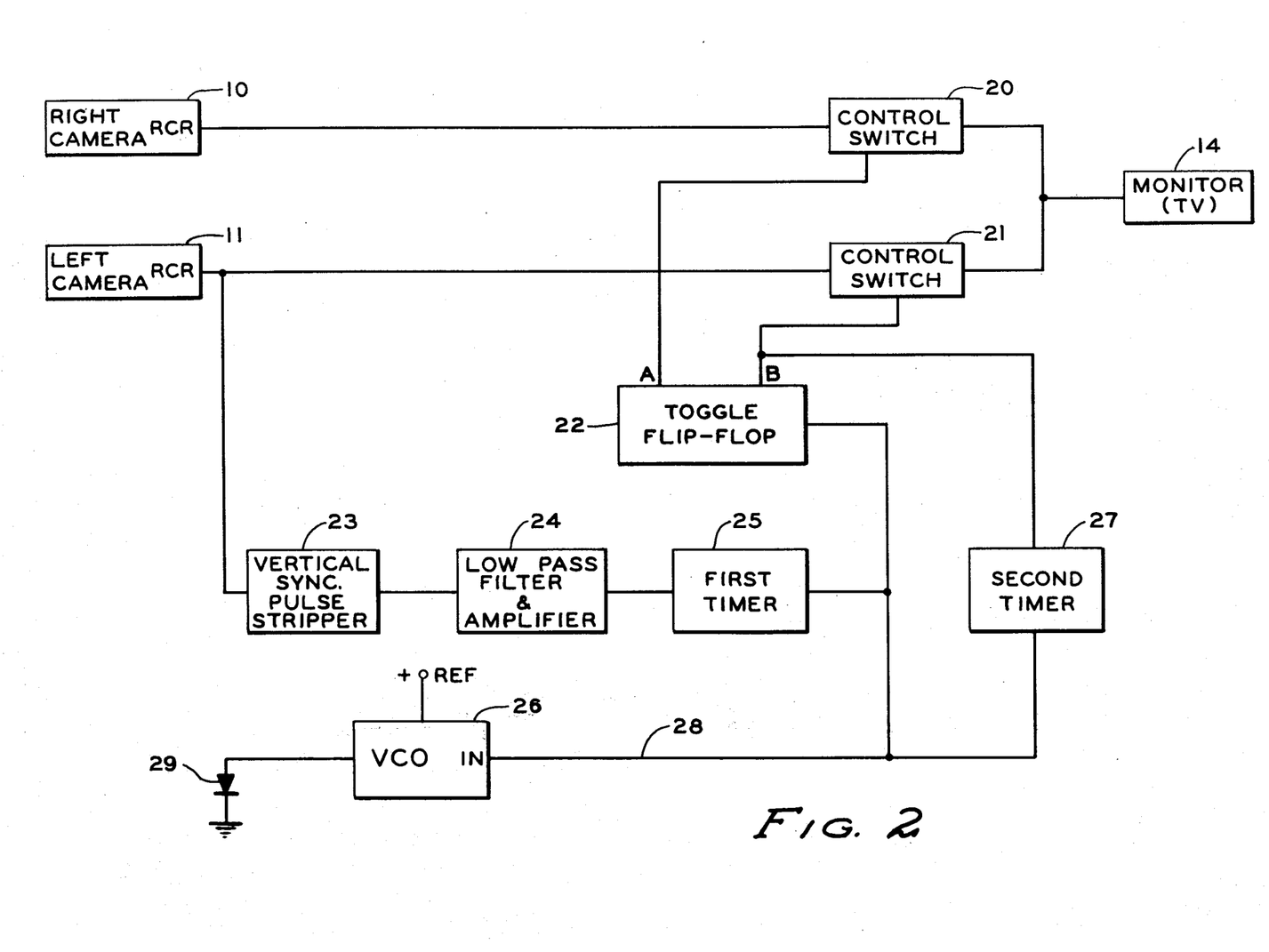
FIG. 2 is a block diagram of the video presentation system of the invention.

FIG. 2 depicts a block diagram of the video presentation system for use in the present invention. The system includes right television camera 10 and left television camera 11. The outputs of the cameras are combined and displayed on the television monitor 14. The system for alternate switching between fields of cameras 10 and 11 includes switches 20 and 21 which accomplish synchronized switching by means of toggle flip-flop 22 operated in conjunction with a vertical sync pulse stripper 23, low pass filter and amplifier 24, a first timer 25 voltage controlled oscillator 26, and a second timer 27 which operate basically in the following manner.

The monitor receives signals as determined by control switches 20 and 21 which determine which camera field scan is displayed by the monitor 14. Control switch 20 is controlled by the output A of toggle flip-flop 22 which, when closed, allows the signal from right camera 10 to flow through control switch 20 to monitor 14. Thus, whenever the output A is at a logical "1", the right camera signal will pass through the control switch 20 and will be displayed. Control switch 21 is similarly controlled by the output B of toggle flip-flop 22. Toggle flip-flop 22 outputs A and B are complements of each other; i.e., when A is a logic "1", B must be a logic "0", etc. Therefore only one camera signal is passed to the monitor at any given time.

The signal from left camera 11 is also connected to the vertical sync pulse stripper 23. The vertical sync pulse stripper 23 strips away the video signal, and leaves the vertical sync pulse as is well known in the art of television signal processing. The output of vertical sync pulse stripper 23 is conducted to the low-pass filter and amplifier 24, the output of which is represented by the timing diagram shown at A in FIG. 4. The vertical pulses shown are of short duration and occur approximately every sixteen milliseconds in a 60 Hz system.

Figure 4:
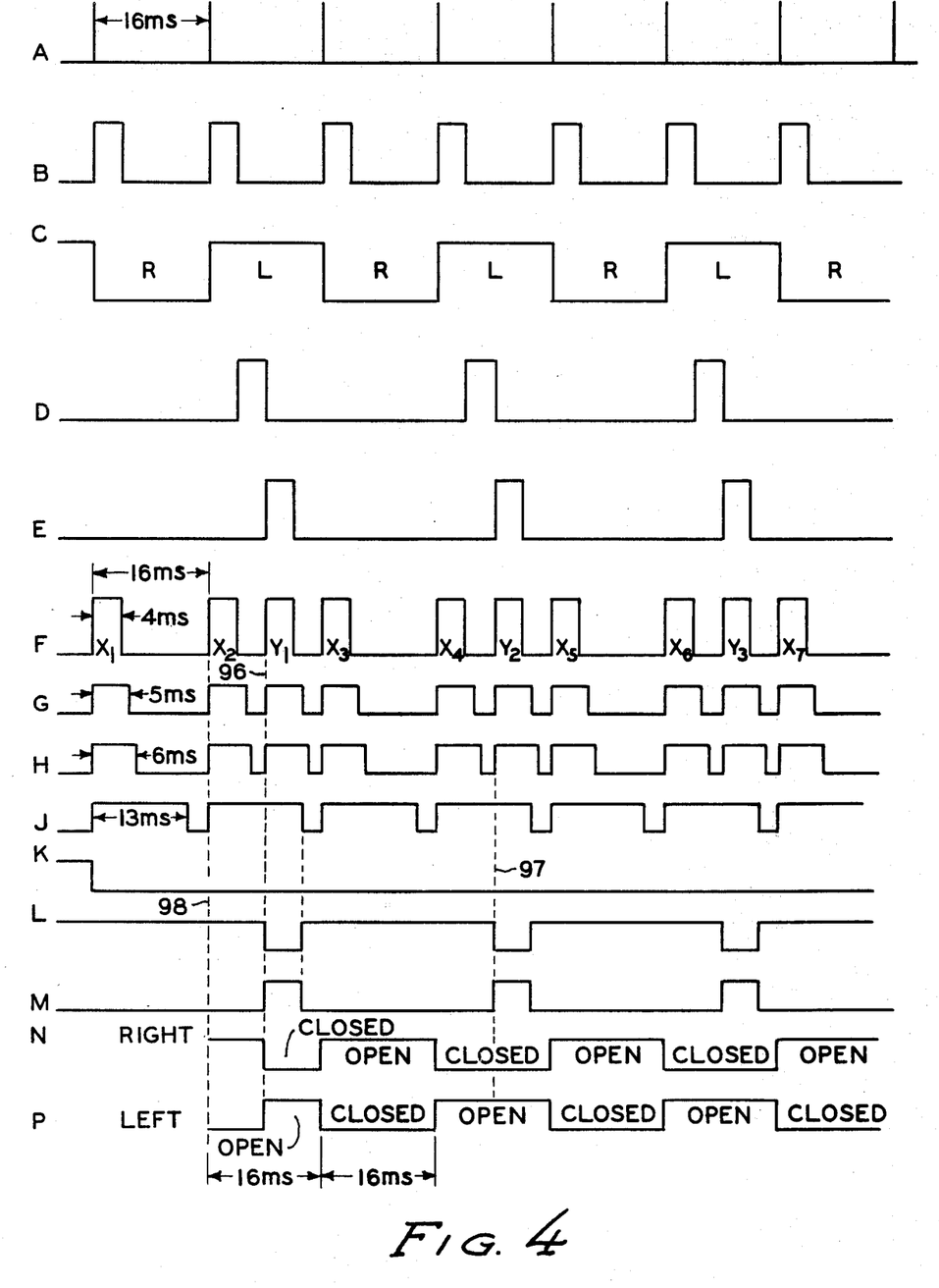
FIG. 4 is a timing diagram illustrating timed synchronization of the video presentation and the stereo vision electro-optic lenses of the viewer.

The output of the low pass filter and amplifier 24 corresponding to each vertical sync pulse becomes an input to and starts a first timer 25 which produces a 4 ms pulse output as shown at B in FIG. 4. The output of the first timer 25 is fed into the toggle flip-flop input and to the input of a voltage controlled oscillator 26, the response of which will be described in detail later. Each time the toggle flip-flop 22 receives a pulse from the first timer 25, the logic states of outputs A and B reverse. Thus, the monitor 14 alternately receives signals through control switch 20 and 21 from right camera 10 and left camera 11 respectively. This is illustrated at C in FIG. 4, which illustrates the output A of toggle flip-flop 22.

The system also provides optical synchronizing signals which control the viewer lenses. The output B of toggle flip-flop 22 which controls the control switch 21, is also fed into the input of a second timer 27. Second timer 27 produces a pulse each time that the output from toggle flip-flop 22 goes from a logic "0" to a logic "1", as is shown at E in FIG. 4. The pulse shown at E in FIG. 4 is a 4 ms pulse which is started 4 ms after the end of the pulse from timer 25.

The outputs of the second timer 27 as well as those of the first timer are combined on conductor 28 and fed into the input of the voltage controlled oscillator 26. The signal on conductor 28 is shown in F at FIG. 4. From this it should be noted that each time the right camera is being received by the monitor 14 a single pulse (X pulse) is provided on conductor 28. When the monitor is receiving the left camera signal, 2 pulses are produced (X and Y pulses). These two pulses have a 4 ms pulse width and are separated by 4 ms.

The voltage controlled oscillator 26 provides an AC signal to one or more light emitting diodes as at 29. When no pulses are present on conductor 28 a "no-pulse" signal to light emitting diode 29 of a frequency $f_1$ is produced. When a pulse is produced on conductor 28, the voltage into the voltage controlled oscillator changes. This causes it to produce a second AC signal at a frequency $f_2$ to the light emitting diode 29. The light emitting diode 29 is pulsed on and off at the frequency of the AC signal received from the voltage controlled oscillator 26. The pulses occur at the basic frequency $f_2$ when no pulse is present on conductor 28 and at the frequency $f_2$ when a pulse is present.

Whenever the TV monitor is displaying the right camera signal, a single pulse is produced from the first timer and causes the voltage controlled oscillator to change frequency for a time equal to the pulse width of the first timer. As the monitor receives the signal from the left camera, voltage controlled oscillator 26 receives two separate pulses which causes voltage controlled oscillator to change frequency twice for times equal to the pulse widths. Corresponding pulsation of the light emitting diode occurs.

Figures 3, 7:
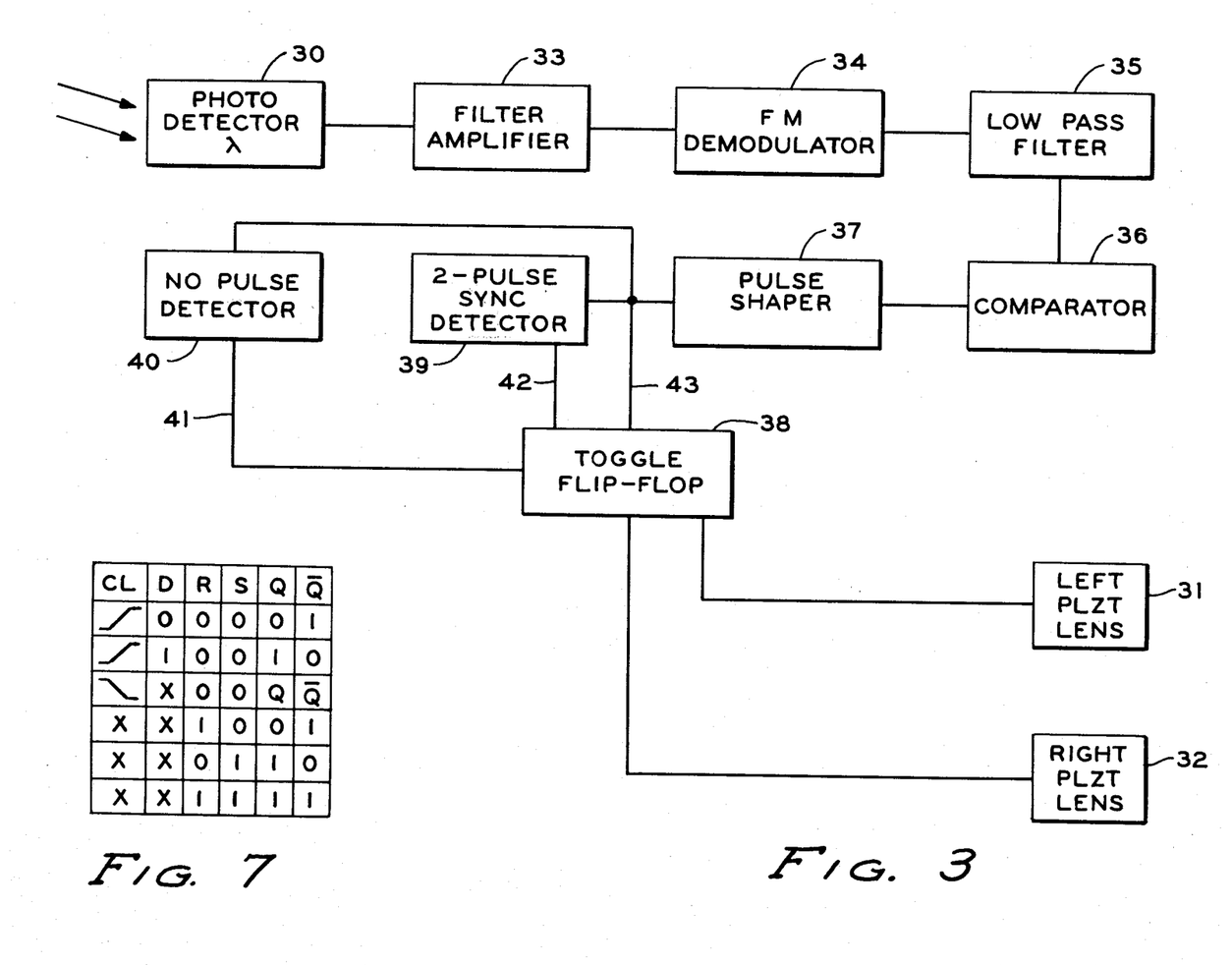
FIG. 3 is a block diagram of the viewing system of the invention.
FIG. 7 is a truth table for a type-D flip-flop used in one embodiment of the invention.

The stereo viewer includes an optical receiving and demodulating system which, in turn, operates a pair of PLZT electro-optic lenses. A block diagram of the stereo viewer is shown in FIG. 3. The optical receiver includes one or more photodetectors 30 for detecting the output of the light emitting diodes 29 from the transmitter as described. The receiver synchronizes the left and right lenses 31 and 32 with respect to a one-pulse or a two-pulse transmitted optical signal. Of course, the photodetector 30 of the viewing lenses must be in the line-of-sight of LED's 29 of the optical transmitter for switching to occur.

In the diagram of FIG. 3, photodetector 30 is followed by a filter-amplifier 33 which discriminates between the signals provided by the light emitting diode from normal ambient (viewing) light and television display light. Filter amplifier 33 will provide an output signal when the optical frequency detected is in the frequency range of signal transmitted by the LED's. The output of filter amplifier 33 is fed into an FM demodulator 34. The FM demodulator 34 provides a DC level shift when the frequency changes from a first frequency to a second frequency. The output of the FM demodulator 34 is fed into a low-pass filter 35 which provides an output corresponding to a low frequency level shift which, in turn, is based on a frequency change of the light emitting diodes 29 of the transmitter section. The output of the low-pass filter 35 approximates the wave form shown at F in FIG. 4. A comparator 36 examines the output signal from the low-pass filter 35 for proper frequency range in order to differentiate the signal from a transient or spurious signal. The output of the comparator 36 becomes the input of a pulse shaping circuit 37, the output of which provides input signals to toggle a flip-flop 38 through a two-pulse sync detector 39, and no-pulse detector 40.

Toggle flip-flop 38 controls the outputs to the left and right PLZT lenses. Toggle flip-flop 38 has inputs 41, 42, and 43. When no-pulse detector 40 detects the absence of any pulses from pulse shaper 37, as occurs when the viewing person turns his attention away from the monitor, it provides the corresponding input on conductor 41 to the toggle flip-flop 38 which, as will be described in more detail later, causes the left and the right lens to be in a transparent state. That is, the left and right lens will be open so that the wearer has normal vision. Two-pulse sync detector 39 provides an output on conductor 42 to control the outputs of toggle flip-flop 38 at a predetermined state when it has received its first two-pulse signal from the pulse shaper 37. Briefly, the two-pulse sync detector 39 through the toggle flip-flop 38, causes the left lens to be made transparent and the right lens opaque, thereby synchronizing the opening of left lens with the two-pulse signal of the left camera. Once the two-pulse sync detector 39 synchronizes the left lens with the left camera, an output signal from pulse shaper 37 on conductor 43 will then toggle the flip-flop 38 for each first pulse of the left camera signal and each pulse of the right camera signal. In this manner toggle flip-flop 38 toggles the left and the right lens corresponding to the viewing of the left and right camera images, respectively.

Figure 5:
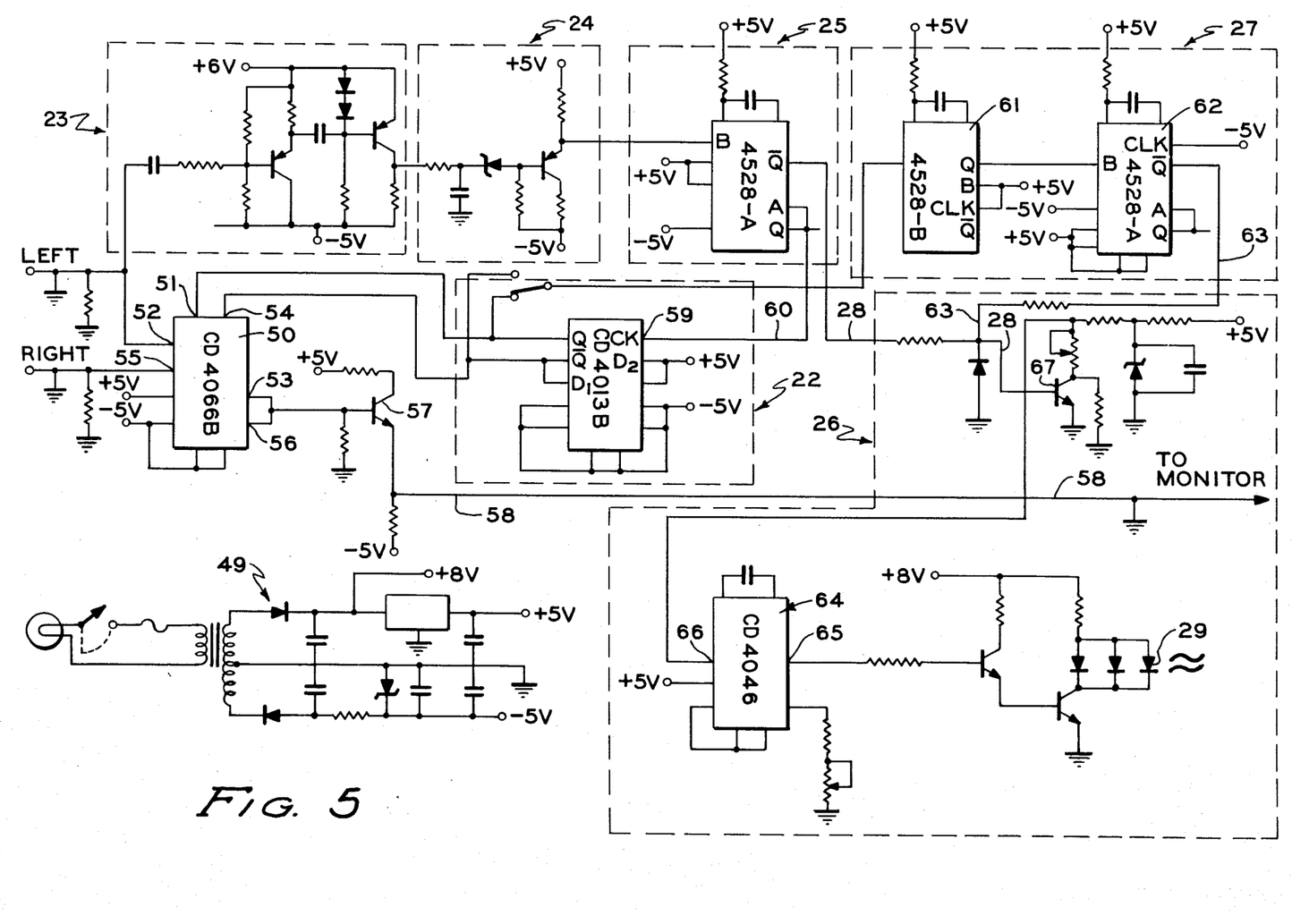
FIG. 5 is an electronic circuit showing an implementation of the block diagram of FIG. 2.
Figure 6:
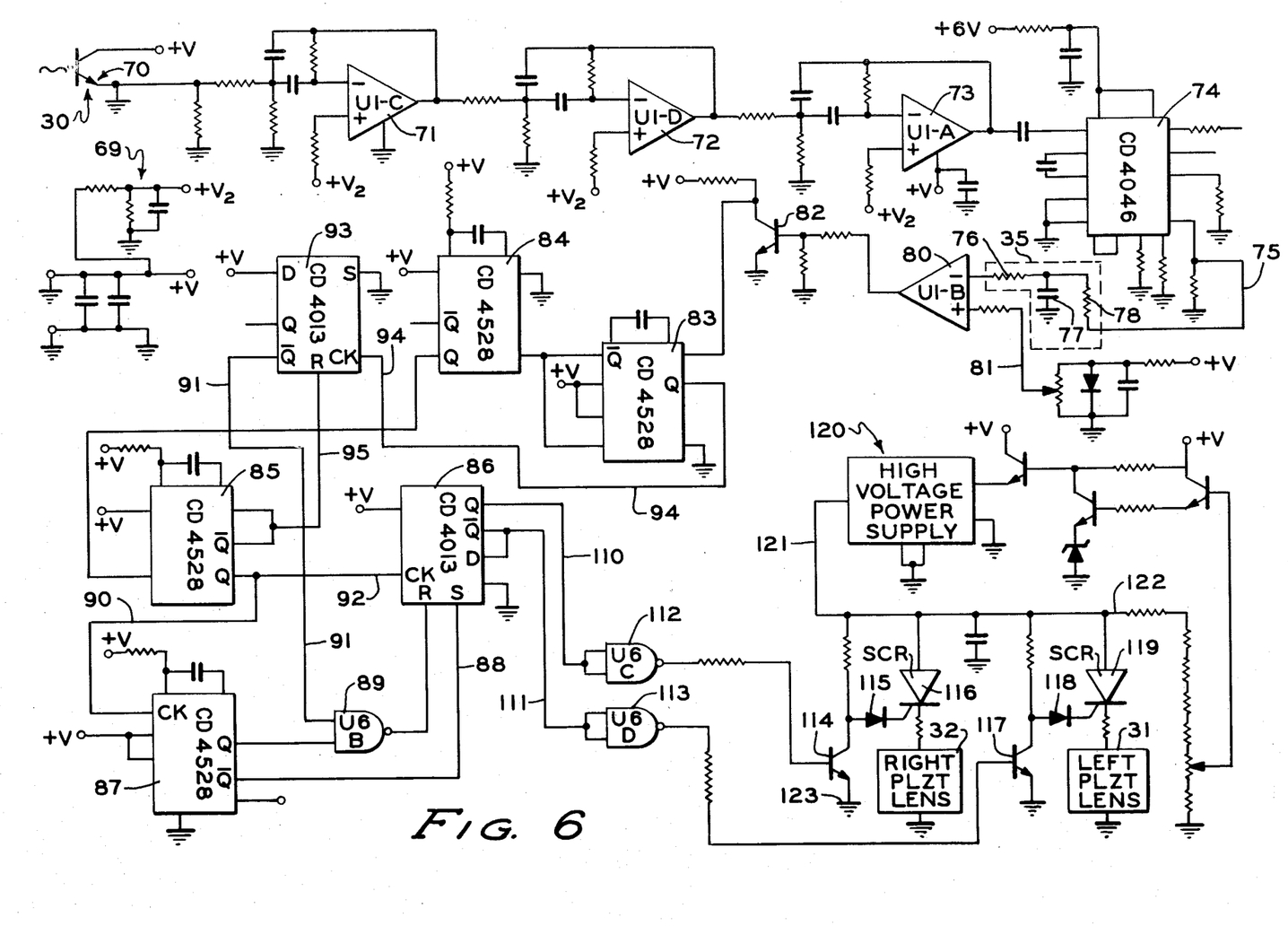
FIG. 6 is an electronic circuit showing an implementation of the block diagram of FIG. 3.

The circuits of FIGS. 5 and 6 represent implementations of the block diagrams shown in FIGS. 2 and 3, respectively. With reference to these figures, the operation of one embodiment of the system will be explained in greater detail.

In FIG. 5, a typical power supply is shown at 49. A bilateral switch shown at 50 contains the control switches 20 and 21 of FIG. 2. Bilateral switch 50 may be, for example, a CD4066B manufactured by RCA Corporation, New York, N.Y. Whenever the input at 51 of switch 50 is a logic "1", the input signal at 52 passes to the output at 53. Similarly, whenever the input at 54 is a logic "1", the input signal at 55 passes to the output 56.

The outputs at 53 and 56 are conducted to the input of a transistor 57 which amplifies the signal before it is fed into the monitor 14 via conductor 58.

The first timer 25 may include a common type 4528-A multivibrator used as a one-shot. The 4528-A generates a 4 ms pulse having two outputs ($\overline{Q}$ and Q). The $\overline{Q}$ output is applied to the voltage controlled oscillator 26, through conductor 28. The Q output is connected to the clock input 59 of the toggle flip-flop 22 via conductor 60. The toggle flip-flop 22 may typically include a type D flip-flop shown as a CD4013B which is well known in the industry. The second timer 27 may be comprised of two 4528 one-shot timers as at 61 and 62. The first one-shot 61 provides a 4 ms delay time, and the second one-shot 62 provides the 4 ms pulse which is delivered to conductor 28 via 63 to provide on input to the voltage controlled oscillator 26.

The voltage controlled oscillator 26 includes a phase locked loop circuit which may utilize a common type CD4046 integrated circuit as shown at 64. The output of the 4046 drives an amplifier circuit which provides a drive signal to drive one or more light emitting diodes 29. The output of the integrated circuit 64 at 65 is an AC signal with a frequency responsive to the input voltage at 66. The voltage at 66, in turn, is determined by the voltage regulator primarily controlled by a transistor 67. When a pulse or signal is present on conductor 28, transistor 67 turns off and the input voltage to integrated circuit 64 changes such that the frequency of the output signal from integrated circuit 64 changes in response thereto. The no-pulse frequency of the integrated circuit 67 is 2.0 KHz. The pulse signal on line 28 changes this to a 3.3 KHz signal.

It can be seen from the above that when no signal is received by either the left or the right camera, the light emitting diodes (LED) 29 are driven by the 2.0 Hz constant frequency signal. When the right camera is being received by the monitor, a first pulse is produced on conductor 28 changing the voltage to the input 66 of the integrated circuit to change the driving frequency of the light emitting diodes to 3.3 Hz. The length of time that the LED is being pulsed at 3.3 Hz is determined by the one-shot timer 25. When the left camera is transmitting, two pulses are produced. The first pulse produced is controlled by the first timer 25, and the second pulse produced is controlled by the second timer 27 with a delayed time and pulse width time as determined by the two one-shot multivibrators 61 and 62.

The receiving and stereo viewer control circuit is shown in FIG. 6. A typical DC power source is shown at 69. A photodetector 30 is shown as a transistor having an output at 70. The output of the photodetector is filtered and successively amplified by amplifiers 71, 72 and 73 in conventional fashion and which together form filter amplifier 33. The FM demodulator includes a CD4046 phase locked loop integrated circuit 74. The output of the phase locked loop integrated circuit 74 provided on conductor 75 is passed through the low-pass filter 35 which includes resistors 76 and 77 and capacitor 78. The output of the low-pass filter 35 is compared by amplifier 80 with reference signal provided on conductor 81. The output of the amplifier 80 is further amplified by a transistor 82.

The pulse shaping circuit shown at 37 in FIG. 3 includes three mono-stable or one-shot timer multivibrator circuits 83, 84, and 85 again using standard CD4528 multivibrator circuits for the one-shot timers. Whenever the output of transistor 82 goes from a low level to a high level, one-shot timer 83 is triggered. The output of one-shot timer 83, in turn, triggers one-shot timer 84, which then triggers one-shot timer 85. Except for very small circuit delays, one-shot timers 83, 84, and 85 all begin timing at the same time as shown in G, H, and J of FIG. 4. The output of multivibrator 83 is shown at G as having a 5 ms pulse width as triggered by the first pulse received by photodetector 30 as shown in F of FIG. 4. The output of multivibrator 84 is shown at H as having a 6 ms pulse width. The output of multivibrator 85 is shown at J as having a 13 ms pulse width. These three one-shot timing pulses started essentially at the same time in the pulse shaper 37 (FIG. 3) in conjunction with signals from the 2-pulse sync detector 39, and the no-pulse detector 40 are utilized to control the toggle flip-flop 38 as will be further described.

As shown in FIG. 6, toggle flip-flop 38 includes a common CD4013 type D flip-flop 86. Flip-flop 86 may be an RCA CD4013 type D flip-flop, the truth table of which is shown in FIG. 7. Of particular interest, is the fact that the outputs Q and $\overline{Q}$ are at a logic "1" when the R and S outputs are both a logic "1". Secondly, with the $\overline{Q}$ output connected to the D input (as shown in FIG. 6) a positive-going transition into the clock input will cause the type D flip-flop to toggle if the R and S inputs are a level "0". The outputs of the flip-flop 86 control the state of the right and left PLZT lenses. As described in greater detail below, a logic level "1" at the Q output will cause the right lens to be transparent, and a logic level "1" at the $\overline{Q}$ output will cause the left lens to be transparent.

With no-pulses received by the photodetector 30, it is desired that the left and the right lenses be transparent. The no-pulse detector 40 of FIG. 3, includes a retriggerable one-shot multivibrator 87 as shown in FIG. 6. Its $\overline{Q}$ output is connected to the S (Set) input of the type D flip-flop 86 via conductor 88 and its Q output is connected to the R (Reset) input to the type D flip-flop 86 through a 2-input NAND gate 89. The clock input to the multivibrator 87 on conductor 90 is connected to the output of the 13 ms one-shot timer 85.

When no-pulses are present on conductor 90, one-shot multivibrator 87 will be in its quiescent state, i.e., Q will be a "0" and $\overline{Q}$ will be a "1". With Q a "0", the output of NAND gate 89 will be a "1" regardless of the state of the other input to it on conductor 91. In this situation, both the R and the S inputs to flip-flop 86 are at a logic "1", forcing Q and $\overline{Q}$ of flip-flop 86 to be a logic level "1". With the logic level "1" on both Q and $\overline{Q}$, the left and right PLZT lenses 31 and 32 will be transparent.

On the other hand, if pulses are present on conductor 90, the Q output will be a logic level "1" and the $\overline{Q}$ will be a logic level "0". The logic level "1" on the Q output of one-shot multivibrator 87 effectively enables NAND gate 89 to respond to the logic level on conductor 91. The output of NAND gate 89 will be the inverted state of whatever signal is on conductor 91, which provides the other input thereto. Assuming there is a logic level "1" on conductor 91, the output of NAND gate 89 will be logic level "0". This renders both the R and S inputs to the flip-flop 86 a logic "0".

With R and S at a logic level "0", the type D flip-flop 86 is enabled to be toggled by the clock input on conductor 92. As shown in FIG. 6, the clock input to type D flip-flop 86 is connected to the output Q of the 13 ms one-shot timer 85 and the $\overline{Q}$ output of flip-flop 86 is connected to the D input. Each time the Q output of one-shot timer 85 goes from a "0" to a "1", the output of the flip-flop 86 changes state as shown in the truth table of FIG. 7.

In order to synchronize the left camera display frame with the left lens, the 2-pulse sync detector 39 (FIG. 3) is used. In FIG. 6, a second type D flip-flop 93 is utilized in the 2-pulse sync detector 39. Flip-flop 93 has its clock input connected to the Q output of the 5 ms one-shot timer 83 via conductor 94. The $\overline{Q}$ output of flip-flop 93 is connected to conductor 91 which as mentioned above provides one input to NAND gate 89. The reset line of flip-flop 93 is connected to the $\overline{Q}$ output of 13 ms one-shot timer 85 via conductor 95. Flip-flop 93 operates to detect the presence of the second pulse within a predetermined time of a first pulse. In the non-set state of flip-flop 93, the $\overline{Q}$ output is a logic level "1" because its reset line is held at a logic level "1" by the Q output of the 13 ms one-shot timer 85. The reset line of flip-flop 93 must be a logic level "0" before a positive-going clock pulse can cause it to be set. The 13 ms one-shot timer 85 must be timing (i.e., $\overline{Q}$ equal "0") before the pulse from 5 ms one-shot timer 83 can set flip-flop 93. This is illustrated below with reference to timing plots F-P of FIG. 4. Once flip-flop 93 is set, the $\overline{Q}$ logic level on conductor 91 is a "0". This causes the output of NAND gate 89 to be a logic level "1", and subsequently the R input of flip-flop 86 to be a logic level "1". In this condition, the Q output of flip-flop 86 is forced to be a logic "0", and its $\overline{Q}$ output forced to equal a logic "1".

This latter state of flip-flop 93 ultimately causes the left lens to be transparent (ON) and the right lens to be opaque (OFF). Since the second pulse caused the forcing of flip-flop 86, the left lens output of flip-flop 93 is synchronized with the left camera. At the end of the 13 ms one-shot timer 85 timing, flip-flop 93 resets, but it does not change the state of flip-flop 86. The reset condition of flip-flop 93 just enables the clock input of flip-flop 93 for clock-gate toggling operation. Subsequent first pulses will trigger the 13 ms one-shot timer 85 causing flip-flop 86 to toggle—synchronously with the alternating left and right camera scans.

The operation of the pulse shaper circuit 37, the 2-pulse sync detector 39, the no-pulse detector 40, and the toggle flip-flop 38 is further illustrated in the timing diagrams F-P of FIG. 4. F of FIG. 4 represents the incoming pulses received by photodetector 30, and also is the representative of the output of transistor 82. As shown at G each pulse shown in F causes the 5 ms one-shot timer 83 to produce a 5 ms pulse. The $\overline{Q}$ output of 5 ms one-shot timer 83 triggers the 6 ms one-shot timer 84 and produces a 6 ms pulse as shown at H in FIG. 4. The Q output of the one-shot 84 triggers the 13 ms one-shot timer 85 as shown at J in FIG. 4. Referring again to diagrams F and J, it can readily be seen that only the X pulse (F) can trigger the 13 ms one-shot timer 85 (J). The Y pulse does not retrigger the 13 ms one-shot timer 85 because the one-shot timer 85 is still timing from the initial X pulse.

The operation of the 2-pulse sync detector 39 will now be described. The output of the 5 ms one-shot timer 83, shown at G of FIG. 4 is fed into the clock input of the flip-flop 93. A diagram of the $\overline{Q}$ output of flip-flop 93 is shown at L in FIG. 4. The reset input of flip-flop 93 is the complement of the Q output of the 13 ms one-shot timer 85 shown at J in FIG. 4. It is important to note that flip-flop 93 can only be set when the clock pulse goes high and wherein the R input was at a logic level "0" before the clock input went high. Because the 13 ms one-shot timer 85 is, in turn, triggered from the 6 ms one-shot timer 84 which is triggered from the 5 ms one-shot 83, a propagation delay exists between the change of state of one-shot timer 83 and one-shot timer 85. In addition, one-shot timer 85 must be triggered before the 5 ms pulse from one-shot timer 83 can cause flip-flop 93 to be set. If the one-shot timer 85 has been triggered causing the R input to flip-flop 93 to be a "0", a second pulse provided by one-shot timer 83 while the 13 ms one-shot timer is timing will cause flip-flop 93 to be set.

The setting of flip-flop 93 forces the flip-flop 86 to be in the synchronized state with the left camera and the left P lens. This is illustrated along line 96 in FIG. 3. At the time of the leading ledge of pulse $Y_1$ of diagram F the 13 ms timer of J is in its timing state. This allows the $\overline{Q}$ output of flip-flop 93 to change state at L which, in turn, causes the R input to flip-flop 86 to become a "1" at M.

The state of the PLZT lenses is shown at N and Q of FIG. 4. Flip-flop 86 causes the synchronization with the right lens in the OFF or opaque state and the left lens in the ON or transparent state as shown along 96 at N and P. Once synchronized, each time the 13 ms one-shot timer is triggered, flip-flop 86 toggles appropriately to be synchronized with the left camera and the right camera. When a second pulse $Y_2$ is received for the second time at 97, the flip-flop 86 has already been synchronized and no change of state occurs. This toggling of the flip-flop 86 will occur indefinitely until no-pulses are detected by photodetector 30. When no-pulses are received by photodetector 30, the state of the retriggerable one-shot timer 87 will change, forcing the Q and the $\overline{Q}$ output of flip-flop 86 to both be "1", making both the left lens and the right lens transparent.

It should be noted that the state of flip-flop 86 is uncertain when the first pulse is detected by the photodetector because of propagation delays in the circuit. However, the second pulse $X_2$ does cause the operation of flip-flop 86 as shown along 98 at N and P.

The final element in the stereo television is the viewer provided each user. The viewer may be configured as a pair of glasses or goggles to be worn in conventional fashion. In addition to the electronics associated with FIGS. 3 and 6, each frame contains two electronic shutters, one of which is shown schematically in FIG. 8. Each electronic shutter includes two optical polarizers 100 and 101 arranged so that their polarization planes are at right angles to each other (crossed) as indicated at 102 and 103 with a polarization rotator 104 interposed between them. The rotator is made of a special transparent ceramic material, lanthanum—doped lead zirconate—titanate. This material is usually referred to by the acronym PLZT formed from a condensation of the chemical symbols for the elements lead, lanthanum, zirconium and titanium.

Figure 8:
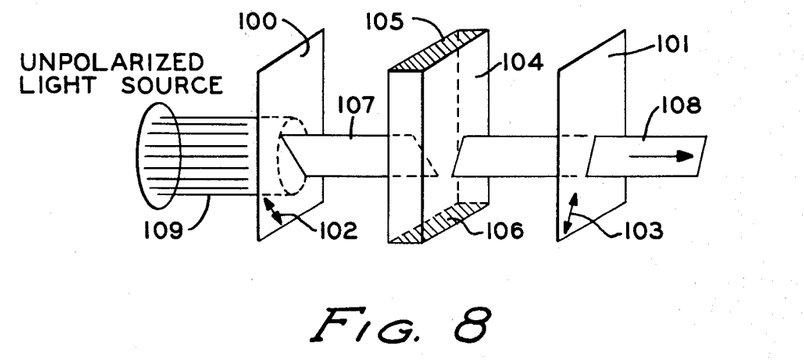
FIG. 8 is an enlarged, exploded view of an electro-optic shutter of the stereo viewer of the invention.

PLZT is a piezo-electric material, and thus has birefringent characteristics when subjected to stress. Consequently, when an electric field is applied perpendicular to the optical transmission path, as through electrodes 105 and 106, the plane of polarization of the transmitted light is rotated as illustrated at 107 and 108. The unpolarized light illustrated at 109 from the TV monitor screen is transmitted through the front polarizer 100, which polarizes the light impinging on the PLZT element 104. If no voltage is applied to the PLZT element the light is blocked by the rear polarizer or analyzer 101. However, when an appropriate electric field is applied to the PLZT material, the polarization of the light is rotated so that is is parallel to that of the analyzer 101 and thus will be transmitted by the analyzer. The characteristics of the PLZT are such that the electric field can be switched in less than the TV vertical flyback time so there are no timing problems. In addition, the on-to-off contrast ratios can be 1000:1 and in the transmission region the coloration is nearly neutral.

Enabling circuitry associated with the application of an electric field to the PLZT electronic shutters is also shown in the diagram of FIG. 6. The Q and $\overline{Q}$ outputs of the type D flip-flop 86 are conducted along conductors 110 and 111, respectively, to corresponding NAND gates 112 and 113. As can also be seen from diagrams N and P of FIG. 4, the Q output signal of flip-flop 86 illustrated at N controls the operation of the right PLZT lens and the $\overline{Q}$ output of flip-flop 86, illustrated at P controls the operation of the left PLZT lens. Associated with NAND gate 112 are transistor 114, diode 115 and SCR 116 which act on the signal from the NAND gate 112 to operate the PLZT electronic shutter of the right viewer lens 32. Likewise a transistor 117, a diode 118, and an SCR 119 are provided to act on the signal from the NAND gate 113 to operate the PLZT shutter of the left viewer lens 31. A conventional power supply is provided, for example, at 120 as shown, and high voltage power$\simeq$500 v DC is connected via conductors 121 and 122.

In operation, when the Q output from the flip-flop 86 is a logic "1", it will be inverted to a logic "0" by the NAND gate 112. The corresponding signal from the NAND gate 112 will then cause the output of the transistor 114 to go high. This triggers the SCR 116 via the diode 115 thereby supplying power to the electronics of the right PLZT lens 32 causing the lens to become transparent to the wearer. When the Q output of the flip-flop 86 is a logic "0", it likewise will be inverted to a "1" by NAND gate 112. The high output from NAND gate 112 will cause the transistor 114 to go low. If the SCR is already conducting current to the PLZT lens 32, the loss of power from the transistor will cause a reverse drain to take place through the diode 115 to ground at 123 deactivating the SCR 116. This removes the current from the electrodes of the right PLZT lens 32 thus rendering the lens opaque.

Similarly with regard to the $\overline{Q}$ output of the flip-flop 86, if it is a logic "1", the left lens will be held open and if it is a logic "0" the left lens will be rendered opaque. This is also illustrated by diagrams N and P of FIG. 4.

As previously described, when no-pulses are received by the photodetector 30, the state of the retriggerable one-shot 87 will change forcing the Q and $\overline{Q}$ outputs of flip-flop 86 to both be a logic "1". This results in current being applied to the electrodes of both lenses rendering them transparent. Thus if transmission is interrupted or a wearer of the stereo viewer looks away such that the photodetector no longer receives pulses from the transmitting LED's, both lenses will open and the wearer will see normally without the need for removing the viewers.

It should be noted that the light emitting diodes or diodes 29 can be any of such device so long as the wave lengths are compatible with the photodetector 30. In one successful embodiment infrared emitting diodes of gallium arsenide (GaAs) were used in conjunction with a standard photocell receiver.

The embodiments of the invention in which an exclusive property or right is claimed are defined as follows:

1. A stereo television receiving system comprising:
    television camera means for recording a perceptible scene from left and right viewpoints by generating field scans corresponding thereto;
    television receiver in communication with said camera means for displaying the images recorded by said camera means;
    multiplexing means for interlacing field scans of said images from said left and said right viewpoints during each television frame;
    light emitting means connected to said multiplexing means for emitting coded pulses of light associated with each of said interlaced scans;
    stereo viewing means having left and right shutter means, one associated with each eye of a television viewer;
    photo detector means in said stereo viewing means for receiving said coded pulses;
    electronic switching means in said stereo viewing shutter means for opening and closing said shutter means; and
    synchronization means for controlling said electronic switching means utilizing said coded pulses such that the corresponding eye is exposed to the corresponding scan of each frame.

2. The apparatus of claim 1 wherein said shutter means comprises an electro-optic PLZT shutter sandwiched between first and second plain polarizers, said second plain polarizer having its axis of polarization perpendicular to that of said first plane polarizer.

3. The apparatus of claim 1 wherein said synchronization means causes both said shutters to be open when said photo detector does not detect any light pulses.

4. The apparatus of claim 1 wherein said synchronization means further comprises:
    flip-flop means having first and second outputs controlling said switching means such that said first output enables said switching means to open said left shutter means and said second output enables said switching means to open said right shutter means;
    timing means responsive to said coded pulses for causing the states of said first and second outputs of switch; and
    code detector means connected to said timing means for detecting the coded pulse associated with one of said scans and forcing the outputs of said flip-flop to be such that said corresponding shutter will be enabled by said switching means.

* * * * *